Figure 1:
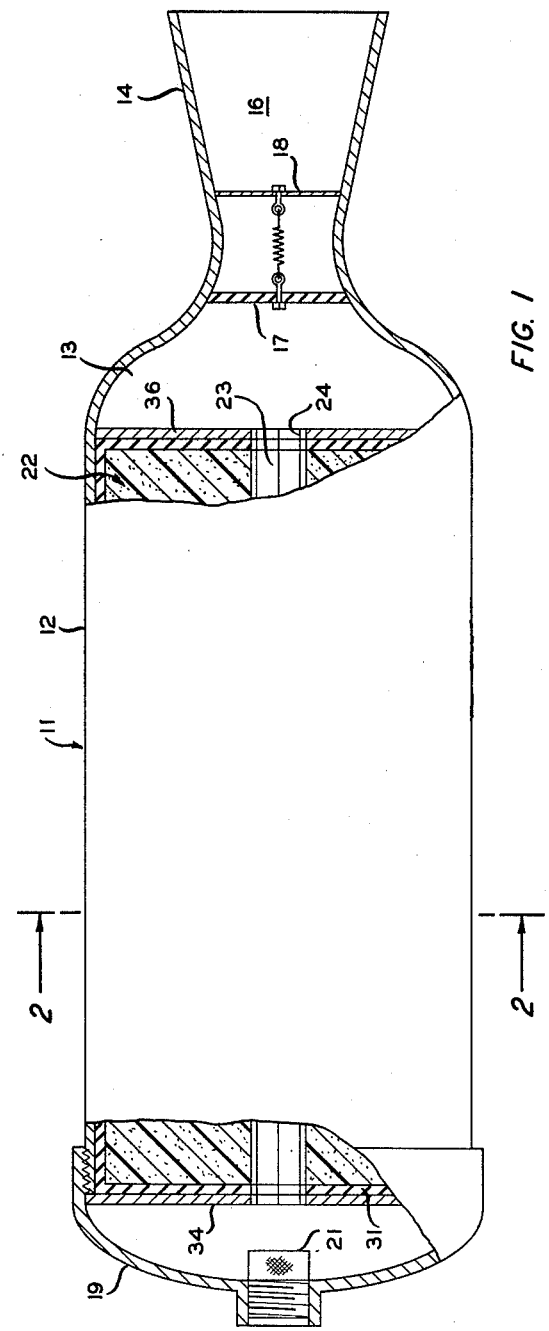

Nov. 17, 1964  L. G. HERRING  3,157,025

ROCKET MOTOR AND SOLID PROPELLANT CHARGE

Filed June 10, 1959

INVENTOR.
L. G. HERRING

BY Hudson E. Young

ATTORNEYS

3,157,025
ROCKET MOTOR AND SOLID PROPELLANT CHARGE

Liles G. Herring, McGregor, Tex., assignor to Phillips Petroleum Company, a corporation of Delaware
Filed June 10, 1959, Ser. No. 819,500
11 Claims. (Cl. 60—35.6)

This invention relates to a solid propellant charge. In another aspect, it relates to a solid propellant charge having surfaces thereof restricted in a novel manner to control the burning or consumption of the propellant charge. In another aspect, it relates to a jet propulsion device, such as a rocket motor, loaded with solid propellant charge. In another aspect, it relates to a rocket motor having an improved case-bonded solid propellant charge.

Rocket motors, such as the type with which this invention is concerned, generally comprise a cylindrical casing defining a combustion chamber loaded or charged with solid rocket propellant which, upon ignition and burning, generates large volumes of gases at high pressures and temperatures. These gaseous products are discharged from the combustion chamber at high velocity through an outlet nozzle located at the rear or aft end of the chamber, thus developing propulsive thrust which propels the rocket motor forward.

When employing a grain or charge of solid propellant material, it is essential that burning of the propellant material proceed at a controlled rate of only certain specified surfaces of the charge in order that the desired propulsive thrust can be maintained for a predetermined period of time. In order to prevent the propellant material from burning on those surfaces where combustion is not desired, it is necessary to restrict or inhibit the burning of these surfaces. When the burning of the propellant material proceeds only on its unrestricted or exposed surfaces, the operating pressure and the shape of the pressure-time curve can be controlled. Any deviation in the burning surface from the desired value often leads to inefficient operation of the rocket motor. Such variations in the burning surface are often caused by faulty restricting material which fails during storage, handling, or firing. If the restricting material employed is not perfectly bonded to the rocket propellant material, uncontrolled or irregular burning will occur on those surfaces exposed by the separation of the restricting material from the propellant surface. Various coating or restricting materials have been employed or proposed in the past and while many of these materials and their mode of application are satisfactory, many of these do not have properties which make for an effective bond capable of withstanding the severe conditions to which restricted rocket propellants are subjected.

In order to achieve maximum loading of a rocket motor with solid propellant, the propellant material is generally fabricated by casting or extruding the propellant material in cylindrical form and bonding the outer cylindrical surface of the charge to the inner wall of the rocket motor casing. Here again, the material used to case-bond the propellant to the inner wall of the casing must have certain desirable properties so as to maintain an effective bond which will withstand the severe conditions of storage, handling, and firing. For example, during storage or transportation of case-bonded rocket motors, the propellant material often undergoes volume changes due to crystal modification of propellant constituents or merely due to thermal expansion or contraction, or both, induced by changes in ambient temperature. Some of the case-bonding materials proposed or used heretofore have been unsatisfactory in that they have not prevented the propellant material from pulling away from the rocket motor casing. If the propellant charge is not effectively bonded to the casing wall, cracks or other surface imperfections in the propellant material may occur which tends to undesirably expose certain surfaces of the propellant charge, on which surfaces uncontrolled burning may result with the consequent buildup of pressure within the combustion chamber of the rocket motor at an excessive rate. The accelerated or uncontrolled combustion thereby resulting produces gases at an undue pressure build-up for a shorter time than that required for the necessary degree of maximum thrust.

The rocket motors are often subjected to shocks and vibration during handling as well as during firing or operation. If the propellant charge is not adequately supported in the rocket motor, the propellant charge may tend to become loose and is likely to be subjected to free movement within the rocket motor, with resultant cracking of propellant material or other damage. As such, the material used to case-bond the propellant charge must also possess desirable properties to maintain the bond despite the severe conditions mentioned.

Figure 2:
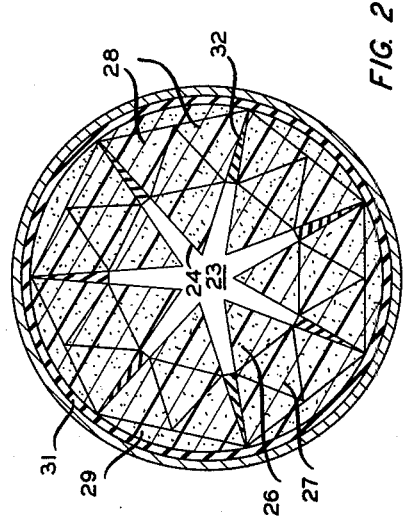

Accordingly, an object of this invention is to provide an improved solid propellant charge having certain surfaces thereof restricted in a novel manner. Another object is to provide novel polyurethane restricting material for restricting certain exposed surfaces of a propellant charge. Another object is to provide a rocket motor loaded with a solid propellant charge having improved restriction. Another object is to provide a rocket motor loaded with a charge of solid propellant which is case-bonded in a novel manner to the casing of the rocket motor. Another object is to provide a rocket motor loaded with solid propellant characterized by the reduced tendency of the propellant to burn on undesirable surfaces which have been restricted. Another object is to restrict solid propellant in such a manner as to prevent or materially reduce flashing, burning or melting, or other failure of the restricting material under the conditions extant in the combustion chamber during handling, storage, or firing. Another object is to provide restricting material having good mechanical properties which will remain effective despite the changes in ambient temperature. Another object is to provide a rocket motor wherein the solid propellant loaded therein is supported in a novel manner so as to maintain the stability of the charge within the chamber, and prevent the charge from breaking away from the casing wall. Other objects and advantages of this invention become apparent to those skilled in the art from the following discussion, appended claims, and drawing in which:

FIGURE 1 is a side view in elevation and partial section of a rocket motor loaded with a solid propellant charge; and FIGURE 2 is a cross-sectional view of FIGURE 1 taken along the plane indicated.

Referring now to the drawing, a rocket motor generally designated 11 is shown having a shell or cylindrical casing 12, made of metal or the like, defining in part a combustion chamber 13. The rear or aft end of casing 12 is reduced and flared to form a nozzle 14 of the De Laval type, which nozzle may be integral with the casing, as shown, or separate and joined thereto. Nozzle 14 is so constructed as to define a converging-diverging passage 16 for the exhaust of gaseous products from combustion chamber 13. A blowout or starter disc 17, made of thin metal, plastic, or the like, is disposed across passage 16 and can be secured thereto in any suitable manner, such as by fastening it to a nozzle plug 18 by means of a spring or the like, the blowout disc and plug being adapted to be ejected from the nozzle passage when a predetermined pressure is reached within the combustion chamber 13. The aft end of casing 12 can also be provided with one or more safety plug attachments capable of releasing excessive pressure from the combustion chamber 13, in a manner well known to those skilled in the art. The fore or head portion of casing 12 is preferably constructed in the form of an annular flange which is welded, threaded, or otherwise secured to a head closure plate 19. Head closure member 19 is provided with an igniter 21, preferably at the center thereof, this igniter being adapted to release ignition material within the combustion chamber 13 during firing. Igniter 21 can be any of the igniters commonly employed in the rocket art; for example, black powder or other suitable pyrotechnic material contained in a suitable frangeable container, such as a wire mesh basket or plastic cup, with suitable electro-responsive means, such as squib or matches, embedded within the pyrotechnic material. Igniter 21 can be fired by closing a suitable switch in an electric circuit which leads to an external power source, such as a battery.

Rocket motor 11 is loaded with a solid propellant charge 22. Charge 22 is generally cylindrical in form and has an axial perforation 23 extending the length thereof, the cross section of the perforation preferably being in the form of a star. The perforation 23 is defined by an exposed burning surface 24. The propellant charge 22 is preferably built up from a plurality of bonded modules or blocks of propellant, which are triangular in cross section and preferably extend the length of the charge. The innermost propellant modules 26 have their inner surfaces exposed to form the exposed burning surface 24 of the charge. The other propellant modules 27, 28 are also triangular in cross section and the outermost module 29 is preferably plano-convex in cross-section, the outer cylindrical surfaces of these outermost nodules making up the outer cylindrical surface of the propellant charge. Any other charge configuration can be employed with the axial perforation having any number of star points.

The outer cylindrical surface of the propellant charge 22 is restricted and case-bonded with novel polyurethane restricting material 31. This material can also be used at 32 between some of the propellant modules 28. The end of charge 22 can also be restricted with the novel restricting material of this invention; the restricted ends can in turn be bonded to charge support plates 34, 35 having axial opening in the shape of the perforation's cross section, these plates being welded or otherwise secured at their periphery to the casing 12. It is thus seen that the outer cylindrical surface of the charge 22 is restricted so that the burning or ignition of the propellant charge is limited to the exposed surface 24.

Although the drawing illustrates a rocket motor loaded with a large, single modular charge of propellant, it is within the scope of this invention to load the rocket motor with a single grain of propellant having an axial perforation, or to align a plurality of either types of grains in a tandem manner within the combustion chamber.

In operation, the rocket motor 11 is fired by closing a suitable switch in an external power circuit. Subsequently, igniter 21 functions and the ignition products are released from the igniter and flow into the combustion chamber 13. The hot combustion products from the igniter 21 immediately propagate throughout the combustion chamber 13 and heat is transferred therefrom to the exposed surface 24 of the charge 22, raising the temperature thereof to an ignition temperature. Consequently, propellant material begins to burn and is consumed, burning of the propellant on surfaces other than the exposed burning surface 24 being prevented due to the restriction. The burning propellant material generates combustion gases which raise the temperature and pressure within the combustion chamber. When a predetermined bursting pressure is reached, e.g., 250–500 p.s.i.g., the starter disc 17 functions, for example, by rupturing and expulsion from the reaction nozzle 16. The pressure within the combustion chamber then levels out at an operating pressure or working pressure, e.g., 500–1000 p.s.i., and the combustion gases pass through the open nozzle passage 16 at a high velocity, thereby imparting thrust to the rocket motor. The propellant material continues to burn until such time as all the propellant material is consumed.

The novel polyurethane material used for restricting and/or case-bonding the propellant material is formed by reacting a mixture of castor oil (the glyceride of ricinoleic acid) and monohydroxyethyltrihydroxypropylethylene diamine with a polyisocyanate, such as toluene diisocyanate.

The compounding recipe used in preparing this novel polyurethane material is broadly set forth in Table I.

*Table I*

| | Parts/100 parts castor oil |
|---|---|
| Castor oil | 100 |
| Monohydroxyethyltrihydroxypropylethylene diamine | 15–30 |
| Polyisocyanate | 40–140 |

A particular useful polyurethane restrictor can be prepared by reacting 100 parts of castor oil, 20 parts of monohydroxyethyltrihydroxypropylethylene diamine with 56 parts of polyisocyanate (such as a 80/20 isomeric mixture of 2,4- and 2,6-toluene diisocyanate) in an aromatic, inert solvent, such as toluene, benzene, xylene, etc. The propellant material to be restricted can be dipped, sprayed, or painted with the polyurethane-solvent mixture, allowed to dry, and cured. This restricted propellant can then be case-bonded to the casing wall of the rocket motor with the novel polyurethane case-bonding material, or with conventional case-bonding adhesives. The propellant itself can be cured prior to restriction and case-bonding, or concomitantly cured with the polyurethane material.

Particular useful polyurethane case-bonding adhesives which can be used can be prepared from the compounding recipe set forth in Table II.

*Table II*

| | Parts/100 parts castor oil |
|---|---|
| Castor oil | 100 |
| Monohydroxyethyltrihydroxypropylethylene diamine | 15–30 |
| Polyisocyanate | 40–65 |

This polyurethane material can be prepared by allowing the castor oil and polyisocyanate to react, to produce a prepolymer, and after it has cooled to room temperature, adding and mixing the diamine. These polyurethane compositions can be applied to the propellant surface in any desired manner, such as with a paint brush, or it can first be applied to the casing wall, or both. The case-bond can be cured at room temperature in a fast manner to produce a very strong tough plastic bond, or it can be cured in an oven at 160 to 200° F. to increase its strength. At the lower limit of polyisocyanate (40–45 parts), the polyurethane adhesive is more flexible and has better adhesive properties.

Another particularly useful polyurethane case-bonding adhesive can be prepared from the following compounding recipe set forth in Table III.

*Table III*

|  | Parts/100 parts castor oil |
|---|---|
| Castor oil | 100 |
| Monohydroxyethyltrihydroxypropylethylene diamine | 15–30 |
| Polypropylene glycol | 30–100 |
| Polyisocyanate | 100–140 |

The polypropylene glycol of this recipe increases the pot-life of the material and acts as a plasticizer to impart flexibility to the bonding agent. This polyurethane material can be prepared by reacting the castor oil and glycol with the isocyanate to form a prepolymer, allowing it to cool to room temperature, and then mixing it with the diamine.

While organic polyisocyanates in general can be used in the practice of the invention, the diisocyanates are usually preferred because of this availability and ease of preparation. Said polyisocyanates should be liquid under the conditions of use. Representative polyisocyanates which can be used in the practice of the invention include, among others, those given in Table IV below.

*Table IV*

Toluene-2,4-diisocyanate
Toluene-2,3-diisocyanate
Commercial mixtures of 2,4- and 2,6-toluene diisocyanate
1,6-hexamethylene diisocyanate
Triphenylmethane triisocyanate
1,5-decamethylene diisocyanate
Cyclopentylene-1,3-diisocyanate
Cyclohexylene-1,3-diisocyanate
Diphenyl-4,4'-diisocyanate
Diphenyl-3,3'-diisocyanate
Toluene-2,5-diisocyanate
Benzene-1,3-diisocyanate
Benzene-1,4-diisocyanate
Benzene-1,2,4-triisocyanate
Toluene-2,4,6-triisocyanate
Benzene-1,3,5-triisocyanate
Benzene-1,2,3-triisocyanate
Toluene-2,3,4-triisocyanate Solid propellants generally are applicable for use in this invention. The invention is particularly applicable for use with solid propellants comprising a major amount of a solid inorganic salt, and a minor amount of a rubber binder material containing reinforcing agent, plasticizers and curing agents. Solid propellant compositions comprising 50 to 90 parts by weight of solid inorganic oxidizing salt; a small amount of a burning rate catalyst; and from 10 to 50 parts by weight of a copolymer of a conjugated diene having 4 to 6 carbon atoms and a heterocyclic nitrogen base together with a reinforcing agent and a plasticizer, are described and claimed in application Serial No. 574,041 filed March 26, 1956, by B. W. Williams et al.

The rubbery polymers employed as binders in the solid rocket fuel compositions of the referred-to copending application are copolymers of conjugated dienes with polymerizable heterocyclic nitrogen bases of the pyridine series. These copolymers can vary in consistency from very soft rubbers, i.e., materials which are soft at room temperature but will show retraction when relaxed, to those having a Mooney value (ML-4) up to 100. The rubbery copolymers most frequently preferred have Mooney values in the range between 10 and 40. They may be prepared by any polymerization methods known to the art, e.g., mass or emulsion polymerization. One convenient method for preparing these copolymers is by emulsion polymerization at temperatures in the range between 0 and 140° F. Recipes such as the iron pyrophosphatehydroperoxide, either sugar-free or containing sugar, the sulfoxylate, and the persulfate recipes are among those which are applicable. It is advantageous to polymerize to high conversion, as the unreacted vinylpyridine monomer is difficult to remove by stripping.

The conjugated dienes employed are those containing from 4 to 6 carbon atoms per molecule and include 1,3-butadiene, isoprene, 2-methyl-1,3-butadiene, and the like. Various alkoxy, such as methoxy and ethoxy and cyano derivatives of these conjugated dienes, are also applicable. Thus, other dienes, such as phenylbutadiene, 2,3-dimethyl-1,3-hexadiene, 2 - methoxy - 3 - ethylbutadiene, 2-ethoxy-3-ethyl-1,3-hexadiene, 2-cyano-1,3-butadiene, are also applicable in the preparation of the polymeric binders of this invention.

Instead of using a single conjugated diene, a mixture of conjugated dienes can be employed. Thus, a mixture of 1,3-butadiene and isoprene can be employed as the conjugated diene portion of the monomer system.

The polymerizable heterocyclic nitrogen bases which are applicable for the production of the polymeric materials are those of the pyridine, quinoline, and isoquinoline series which are copolymerizable with a conjugated diene and contain one, and only one,

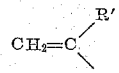

substituent wherein R' is either hydrogen or a methyl group. That is, the substituent is either a vinyl or an alpha-methylvinyl (isopropenyl) group. Of these, the compounds of the pyridine series are of the greatest interest commercially at present. Various substituted derivatives are also applicable but the total number of carbon atoms in the groups attached to the carbon atoms of the heterocyclic nucleum should not be greater than 15 because the polymerization rate decrease somewhat with increasing size of the alkyl group. Compounds where the alkyl substituents are methyl and/or ethyl are available commercially.

These heterocyclic nitrogen bases have the formula

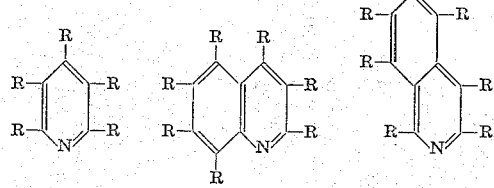

where R is selected from the group consisting of hydrogen, alkyl, vinyl, alpha-methylvinyl, alkoxy, halo, hydroxy, cyano, aryloxy, aryl, and combinations of these groups such as haloalkyl, alkylaryl, hydroxyaryl, and the like, one and only one of said groups being selected from the group consisting of vinyl and alpha-methylvinyl; and the total number of carbon atoms in the nuclear substituted groups being not greater than 15. Examples of such compounds are 2-vinylpyridine; 2-vinyl-5-ethylpyridine; 2-methyl-5-vinylpyridine; 4-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 2,4-dimethyl-5,6 - dipentayl-3 - vinylpyridine; 2-decyl-5-(alpha-methylvinyl)pyridine; 2-vinyl-3-methyl-5-ethylpyridine; 2-methoxy-4-chloro-6-vinylpyridine; 3-vinyl-5-ethoxypyridine; 2-vinyl-4,5-dichloropyridine; 2-(alpha-methylvinyl)-4-hydroxy-6-cyanopyridine; 2-vinyl-4-phenoxy-5-methylpyridine; 2-cyano-5-(alpha-methylvinyl)pyridine; 3-vinyl-5-phenylpyridine; 2-(para-methyl-phenyl)-3-vinyl-4-methylpyridine; 3-vinyl-5-(hydroxyphenyl)-pyridine; 2-vinylquinoline; 2-vinyl-4-ethylquinoline; 3-vinyl-6,7-di-n-propylquinoline; 2-methyl-4-nonyl-6-vinylquinoline; 4(alpha-methylvinyl)-8-dodecylquinoline; 3-vinylisoquinoline; 1,6-dimethyl-3-vinylisoquinoline; 2-vinyl-4-benzylquinoline; 3-vinyl-5-chloroethylquinoline-3-vinyl-5,6-dichloroisoquinoline; 2-vinyl-6-ethoxy-7-methylquinoline; 3-vinyl-6-hydroxymethylisoquinoline; and the like.

Solid inorganic oxidizing salts which are applicable in the solid rocket fuel compositions of this invention include ammonium, alkali metal, and alkaline earth metal salts of nitric, perchloric, and chloric acids, and mixtures thereof. Ammonium nitrate and ammonium perchlorate are the preferred oxidants for use in the solid rocket fuels of this invention. Specific oxidants include sodium nitrate, potassium perchlorate, lithium chlorate, calcium nitrate, barium perchlorate, and strontium chlorate. Mixtures of oxidants are also applicable. In the preparation of the solid rocket fuel compositions, the oxidants are powdered to sizes preferably 5 to 300 microns average particle size. The amount of solid oxidant employed is usually a major amount of the total composition and is generally in the range between 50 and 95 percent by weight of the total mixture of oxidant and binder. If desired, however, less than 50 percent by weight of the oxidant can be used.

Combustion rate catalysts applicable in the invention include ammonium dichromate, metal ferrocyanides and metal ferricyanides. The complex metal cyanides are preferred. Ferric ferrocyanides, such as Prussian, Berlin, Hamburg, Chinese, Paris, and Milori blue, soluble ferric ferrocyanide which has been treated with ammonia, are among the materials which can be used. Ferous ferricyanide, Turnbull's blue is also applicable. A particularly among the materials which can be used. Ferous ferricyanide, Turnbull's blue is also applicable. A particularly effective burning rate catalyst is Milori blue which is pigment similar to Prussian blue and is prepared by the oxidation of a paste of potassium ferrocyanide and ferrous sulfate. Other metal compounds such as nickel and copper ferrocyanides can also be employed. The amount of combustion catalyst will usually be 0.25 to 12 parts by weight per hundred parts of oxidant and binder. The catalyst can be omitted entirely if desired.

Reinforcing agents include carbon black, wood flour, lignin, and various reinforcing resins such as styrene-divinylbenzene, methyl acrylate-divinylbenzene, acrylic acid-styrene-divinylbenzene, and methyl acrylate-acrylic acid-divinylbenzene resins. The reinforcing agent is usually used in an amount in the range of 10 to 50 parts by weight per hundred parts by weight of copolymer. The reinforcing agent can be omitted if desired.

In general, any rubber plasticizers can be employed in these binder compositions. Materials such as Pentaryl A (amylbiphenyl), Paraflux (saturated polymerized hydrocarbon), Circosol-2XH (petroleum hydrocarbon softener having a specific gravity of 0.940 and a Saybolt Universal viscosity at 100° F. of about 2000 seconds), dibutoxyethoxyethyl formal, and dioctyl phthalate are suitable plasticizers. Materials which provide rubber having good low temperature properties are preferred. It is also frequently preferred that the plasticizers be oxygen-containing materials. The amount of plasticizer used will be only that required to render the copolymer manageable during incorporation of the oxidizer and extruding the product. Ordinarily 15 to 30 parts by weight per hundred parts by weight of copolymer of the plasticizer will be used although more or less can be used and can be omitted if its presence is not required to incorporate the ingredients. Liquid polybutadiene and aromatic hydrocarbon oils resulting from the distillation of petroleum fractions are preferred plasticizers because they are particularly effective in rendering the components of the composition manageable and are entirely consumed as fuel. An aromatic residual oil having an API gravity at 60° F. of about 10 to about 13.5 has been found particularly effective.

The various ingredients in the rocket fuel composition can be mixed on a roll mill or an internal mixer such as a Banbury, Bramley-Beken, or a Baker-Perkins dispersion blade mixer can be employed. The binder forms the continuous phase in the finished fuel composition with the oxidant as the discontinuous phase.

Various modifications and alterations of this invention will become apparent to those skilled in the art from the foregoing discussion and accompanying drawing, and it should be understood that this invention is not necessarily limited thereto.

I claim:

1. A solid propellant charge comprising a major amount of an inorganic oxidizer and a minor amount of a fuel-binder comprising a copolymer of a conjugated diene and a vinyl-substituted heterocyclic nitrogen compound selected from the pyridine, quinoline, and isoquinoline series, said charge having exposed burning surfaces and other surfaces covered with polyurethane material formed by reacting castor oil and monohydroxyethyltrihydroxypropylethylene diamine with a polyisocyanate selected from the group consisting of:

Toluene-2,4-diisocyanate
Toluene-2,3-diisocyanate
Toluene-2,6-diisocyanate
1,6-hexamethylene diisocyanate
Triphenylmethane triisocyanate
1,5-decamethylene diisocyanate
Cyclopentylene-1,3-diisocyanate
Cyclohexylene-1,3-diisocyanate
Diphenyl-4,4'-diisocyanate
Diphenyl-3,3'-diisocyanate
Toluene-2,5-diisocyanate
Benzene-1,3-diisocyanate
Benzene-1,4-diisocyanate
Benzene-1,2,4-triisocyanate
Toluene-2,4,6-triisocyanate
Benzene-1,3,5-triisocyanate
Benzene-1,2,3-triisocyanate
Toluene-2,3,4-triisocyanate 2. The solid propellant charge according to claim 1 wherein the amounts of said diamine and polyisocyanate used are 15 to 30 parts and 40 to 65 parts, respectively, per 100 parts of said castor oil.

3. The solid propellant charge of claim 1 wherein said solvent is toluene and said polyisocyanate is toluene diisocyanate.

4. The solid propellant charge according to claim 1 wherein said oxidizer is selected from the group consisting of the ammonium, alkali metal, and alkaline earth metal salts of nitric, perchloric, and chloric acids.

5. The solid propellant charge according to claim 1 wherein said oxidizer is ammonium perchlorate and said copolymer is a copolymer of 1,3-butadiene and 2-methyl-5-vinylpyridine.

6. The solid propellant charge of claim 1 wherein said reacting of castor oil, monohydroxyethyltrihydroxypropylethylene diamine, and said polyisocyanate is carried out in an organic inert solvent.

7. The rocket motor of claim 6 wherein the amounts of said diamine and polyisocyanate used are 15 to 30 parts and 40 to 140 parts, respectively, per 100 parts of said castor oil.

8. The rocket motor of claim 6 wherein said oxidizer is selected from the group consisting of the ammonium, alkali metal, and alkaline earth metal salts of nitric, perchloric, and chloric acids.

9. The rocket motor of claim 8 wherein said oxidizer is ammonium perchlorate and said copolymer is a copolymer of 1,3-butadiene and 2-methyl-5-vinylpyridine.

10. A solid propellant charge comprising propellant of the composite type comprising a major amount of an inorganic oxidizer and a minor amount of a fuel-binder comprising a copolymer of a conjugated diene and a vinyl substituted heterocyclic nitrogen compound selected from the pyridine, quinoline, and isoquinoline series, said charge having exposed burning surfaces and other surfaces restricted and covered with polyurethane material formed by reacting castor oil and monohydroxyethyltrihydroxypropylethylene diamine with a polyisocyanate, wherein the amounts of said diamine and polyisocyanate used are 15 to 30 parts and 40 to 140 parts, respectively, per 100 parts of said castor oil, said polyisocyanate being selected from the group consisting of:

Toluene-2,4-diisocyanate
Toluene-2,3-diisocyanate
Toluene-2,6-diisocyanate
1,6-hexamethylene diisocyanate
Triphenylmethane triisocyanate
1,5-decamethylene diisocyanate
Cyclopentylene-1,3-diisocyanate
Cyclohexylene-1,3-diisocyanate
Diphenyl-4,4'-diisocyanate
Diphenyl-3,3'-diisocyanate
Toluene-2,5-diisocyanate
Benzene-1,3-diisocyanate
Benzene-1,4-diisocyanate
Benzene-1,2,4-triisocyanate
Toluene-2,4,6-triisocyanate
Benzene-1,3,5-triisocyanate
Benzene-1,2,3-triisocyanate
Toluene-2,3,4-triisocyanate 11. A rocket motor having a casing defining a combustion chamber, an exhaust nozzle communicating with said chamber, and a solid propellant charge loaded in said chamber, said charge being cylindrical in shape and having an axial perforation defined by an exposed burning surface, said propellant charge comprising a major amount of an inorganic oxidizer and a minor amount of of a fuel-binder comprising a copolymer of a conjugated diene and a vinyl-substituted heterocyclic nitrogen compound selected from the pyridine, quinoline, and isoquinoline series, and polyurethane material case-bonding the outer cylindrical surface of said propellant charge to said casing, said polyurethane material formed by reacting castor oil and monohydroxyethyltrihydroxypropylethylene diamine with a polyisocyanate selected from the group consisting of:

Toluene-2,4-diisocyanate
Toluene-2,3-diisocyanate
Toluene-2,6-diisocyanate
1,6-hexamethylene diisocyanate
Triphenylmethane triisocyanate
1,5-decamethylene diisocyanate
Cyclopentylene-1,3-diisocyanate
Cyclohexylene-1,3-diisocyanate
Diphenyl-4,4'-diisocyanate
Diphenyl-3,3'-diisocyanate
Toluene-2,5-diisocyanate
Benzene-1,3-diisocyanate
Benzene-1,4-diisocyanate
Benzene-1,2,4-triisocyanate
Toluene-2,4,6-triisocyanate
Benzene-1,3,5-triisocyanate
Benzene-1,2,3-triioscyanate
Toluene-2,3,4-triisocyanate References Cited in the file of this patent
UNITED STATES PATENTS

| | | |
|---|---|---|
| 2,563,265 | Parsons | Aug. 7, 1951 |
| 2,597,025 | Orth | May 20, 1952 |
| 2,643,184 | Cairns | June 23, 1953 |
| 2,661,692 | Vegren | Dec. 8, 1953 |
| 2,750,887 | Marcus | June 19, 1956 |
| 2,791,883 | Moore et al. | May 14, 1957 |
| 2,857,258 | Thomas | Oct. 21, 1958 |
| 2,873,266 | Urs | Feb. 10, 1959 |
| 2,877,504 | Fox | May 17, 1959 |
| 3,010,355 | Cutforth | Nov. 28, 1961 |

OTHER REFERENCES

Zaehringer: "Solid Propellant Rocket—Second Stage," American Rocket Co., Box 1112, Wyandotte, Mich. (September 1958), pp. 211, 214, 217 and 219.

Noland: Chemical Engineering, vol. 65, No. 10, May 19, 1958, pp. 154 and 155.

Zaehringer et al.: Missiles and Rockets, vol. 3, No. 3, March 1958, pp. 69 and 71.